(12) United States Patent
Tanaka

(10) Patent No.: US 9,676,100 B2
(45) Date of Patent: Jun. 13, 2017

(54) CONTROL APPARATUS OF ROBOT, ROBOT, AND PROGRAM THEREOF

(71) Applicant: CANON KABUSHIKI KAISHA, Tokyo (JP)

(72) Inventor: Motoyasu Tanaka, Chofu-shi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/363,228

(22) PCT Filed: Feb. 5, 2013

(86) PCT No.: PCT/JP2013/053163
§ 371 (c)(1),
(2) Date: Jun. 5, 2014

(87) PCT Pub. No.: WO2013/122018
PCT Pub. Date: Aug. 22, 2013

(65) Prior Publication Data
US 2015/0051735 A1 Feb. 19, 2015

(30) Foreign Application Priority Data
Feb. 16, 2012 (JP) .................... 2012-031872

(51) Int. Cl.
*B25J 9/16* (2006.01)

(52) U.S. Cl.
CPC ... *B25J 9/1638* (2013.01); *G05B 2219/41139* (2013.01); *G05B 2219/42289* (2013.01)

(58) Field of Classification Search
CPC ...... B25J 9/1638; B25J 9/1653; B25J 9/1633; B25J 9/163; B25J 9/1628; B25J 9/1635;
(Continued)

(56) References Cited

U.S. PATENT DOCUMENTS 4,200,827 A 4/1980 Oswald
4,710,884 A * 12/1987 Tokairin ................ B25J 9/1638
                                                         700/254
(Continued)

FOREIGN PATENT DOCUMENTS

EP 0 596 241 A2 5/1994
JP 61-201304 A 6/1986
(Continued)

OTHER PUBLICATIONS

International Preliminary Report on Patentability and Written Opinion of the International Searching Authority dated Aug. 19, 2014 in PCT/JP2013/053163.
(Continued)

*Primary Examiner* — Stephen Holwerda
(74) *Attorney, Agent, or Firm* — Fitzpatrick, Cella, Harper & Scinto

(57) ABSTRACT

A trajectory along which a robot is driven by an actuator is calculated using a first constraint value. A target value of the robot and a second constraint value are used to calculate a target trajectory of the robot. A deflection correction amount of the robot is calculated. The target trajectory is corrected from the deflection correction amount to calculate a deflection correction trajectory. Performance of the actuator necessary to operate the robot based on the deflection correction trajectory is calculated. It is determined whether a first condition that the actuator performance is within a range of the first constraint value and a second condition that a difference between the first constraint value and the actuator performance is within a range of a predetermined value are satisfied. The deflection trajectory is output to the actuator if it is determined that the first condition and the second condition are satisfied.

7 Claims, 7 Drawing Sheets

(58) Field of Classification Search
CPC ............... B25J 9/1646; B25J 9/1648; G05B 2219/42289; G05B 2219/41139
See application file for complete search history.

(56) References Cited

U.S. PATENT DOCUMENTS

| | | | | |
|---|---|---|---|---|
| 5,049,797 | A * | 9/1991 | Phillips | B25J 9/1635 318/568.16 |
| 5,418,441 | A * | 5/1995 | Furukawa | B25J 9/1641 318/568.22 |
| 6,826,450 | B2 | 11/2004 | Watanabe et al. | |
| 2001/0045807 | A1 * | 11/2001 | McConnell | B25J 9/1635 318/568.2 |
| 2002/0173878 | A1 * | 11/2002 | Watanabe | B25J 9/1638 700/245 |
| 2004/0207354 | A1 * | 10/2004 | Kaplan | B25J 9/1638 318/568.11 |
| 2008/0297092 | A1 | 12/2008 | Nihei et al. | |

FOREIGN PATENT DOCUMENTS

| | | |
|---|---|---|
| JP | 5-69899 A | 3/1993 |
| JP | 11-134012 A | 5/1999 |
| JP | 3808321 B2 | 8/2006 |

OTHER PUBLICATIONS

J.E. Bobrow, et al., "Time-Optimal Control of Robotic Manipulators Along Specified Paths", Int. J. of Robotics Research, 4, 3, pp. 3-17, Fall 1989.
PCT International Search Report and Written Opinion of the International Searching Authority, dated May 21, 2013, in PCT/JP2013/053163.
Japanese Office Action dated Dec. 15, 2015 in corresponding Japanese Application No. 2012-031872.

* cited by examiner

CONTROL APPARATUS OF ROBOT, ROBOT, AND PROGRAM THEREOF

This application is a national stage application under 35 U.S.C. §371 of International Application No. PCT/JP2013/053163, having an International filing date of Feb. 5, 2013, which claims priority to Japan 2012-031872, filed on Feb. 16, 2012, the contents of each of which are incorporated by reference as if set forth in full herein.

TECHNICAL FIELD

The present invention relates to a control apparatus of a robot driven by an actuator, such as an industrial robot arm for conveying or assembling components, a robot, and a program thereof.

BACKGROUND ART

For example, high-speed, highly accurate operation and weight reduction of an industrial robot are demanded along with the expansion of the range of use. With the increase in the demand for the weight reduction of the robot and for the increase in the robot operation speed, the deflection of a mechanical section of the robot, such as an arm section operated by an actuator, increases, and the influence on the accuracy cannot be ignored. For the deflection of the mechanical section of the robot, the deflection is estimated and compensated to perform highly accurate operation in a conventional robot.

For example, a configuration is proposed in which an amount of deflection of a joint of a robot arm is calculated from load torque and stiffness of the joint of the robot arm, and the amount of deflection is added to an angle command value of each axis (PTL 1). A configuration is also proposed in which an amount of deflection of a link is calculated in addition to a decelerator, and inverse kinetics calculation is used to modify an angle command value of each axis to compensate the deflection (PTL 2).

CITATION LIST

Patent Literature

PTL 1: Japanese Patent Application Laid-Open No. S61-201304
PTL 2: Japanese Patent No. 3808321

SUMMARY OF INVENTION

Technical Problem

In the conventional techniques, the amount of deflection generated at the joint section of the robot relative to a target trajectory is calculated, and the target trajectory is corrected based on the amount of deflection to drive the actuator of each axis (deflection correction drive). However, actuator performance necessary for realizing the deflection correction drive is not taken into account.

When the actuator is actually subjected to the deflection correction drive, acceleration and deceleration torque of the actuator significantly changes according to the amount of deflection. Therefore, if the actuator performance is not taken into account, the actuator performance necessary for the deflection correction drive may exceed a constraint value that is set as an upper limit of the performance of the actuator. For example, the torque necessary for the deflection correction drive may exceed an upper limit value of the torque as a constraint value.

In this way, when the actuator performance necessary for the deflection correction drive exceeds the constraint value, response deterioration associated with an increase in tracking errors of actuators and error termination due to over current may occur. This may affect the operation performance of the robot arm.

On the other hand, the actuator performance necessary for the deflection correction drive may be a significantly small value relative to the constraint value, and the surplus may be excessive. In this case, the performance of the actuators is not effectively utilized. In other words, this is a state in which faster operation is possible if the performance of the actuators is sufficiently utilized.

In view of the circumstances, the present invention has been invented to realize a structure capable of deflection correction drive, in which actuator performance can be effectively utilized, and the actuator performance necessary for the deflection correction drive does not exceed an upper limit of the performance of actuators.

Solution to Problem

The present invention provides a control apparatus of a robot driven by an actuator with a first constraint value that is set as an upper limit of performance, the control apparatus including: a target trajectory calculation unit that uses a target value of the robot and a second constraint value to solve an optimal control problem to calculate a target trajectory of the robot; a deflection correction amount calculation unit that calculates a deflection correction amount of the robot when the robot is operated based on the target trajectory; a deflection correction trajectory calculation unit that corrects the target trajectory from the deflection correction amount to calculate a deflection correction trajectory; an actuator performance calculation unit that calculates performance of the actuator necessary to operate the robot based on the deflection correction trajectory; a determination unit that determines whether a first condition that the actuator performance calculated by the actuator performance calculation unit is within a range of the first constraint value and a second condition that a difference between the first constraint value and the actuator performance is within a range of a predetermined value are satisfied; a constraint value change unit that changes the second constraint value if the determination unit determines that one of the first condition and the second condition is not satisfied; and a trajectory decision unit that decides, as a trajectory of the robot, the deflection correction trajectory calculated by the deflection correction trajectory calculation unit if the determination unit determines that the first condition and the second condition are satisfied.

Advantageous Effects of Invention

According to the present invention, the second constraint value for solving the optimal control problem can be changed to obtain the deflection correction trajectory, in which the actuator performance necessary for the deflection correction drive does not exceed the first constraint value, and the actuator performance is within the range of the predetermined value relative to the first constraint value. Therefore, deflection correction drive can be performed, in which the actuator performance can be effectively utilized, and the actuator performance necessary for the deflection correction drive does not exceed the upper limit of the performance of the actuators.

Further features of the present invention will become apparent from the following description of exemplary embodiments with reference to the attached drawings.

DESCRIPTION OF EMBODIMENTS

Example of Robot

Figure 1:
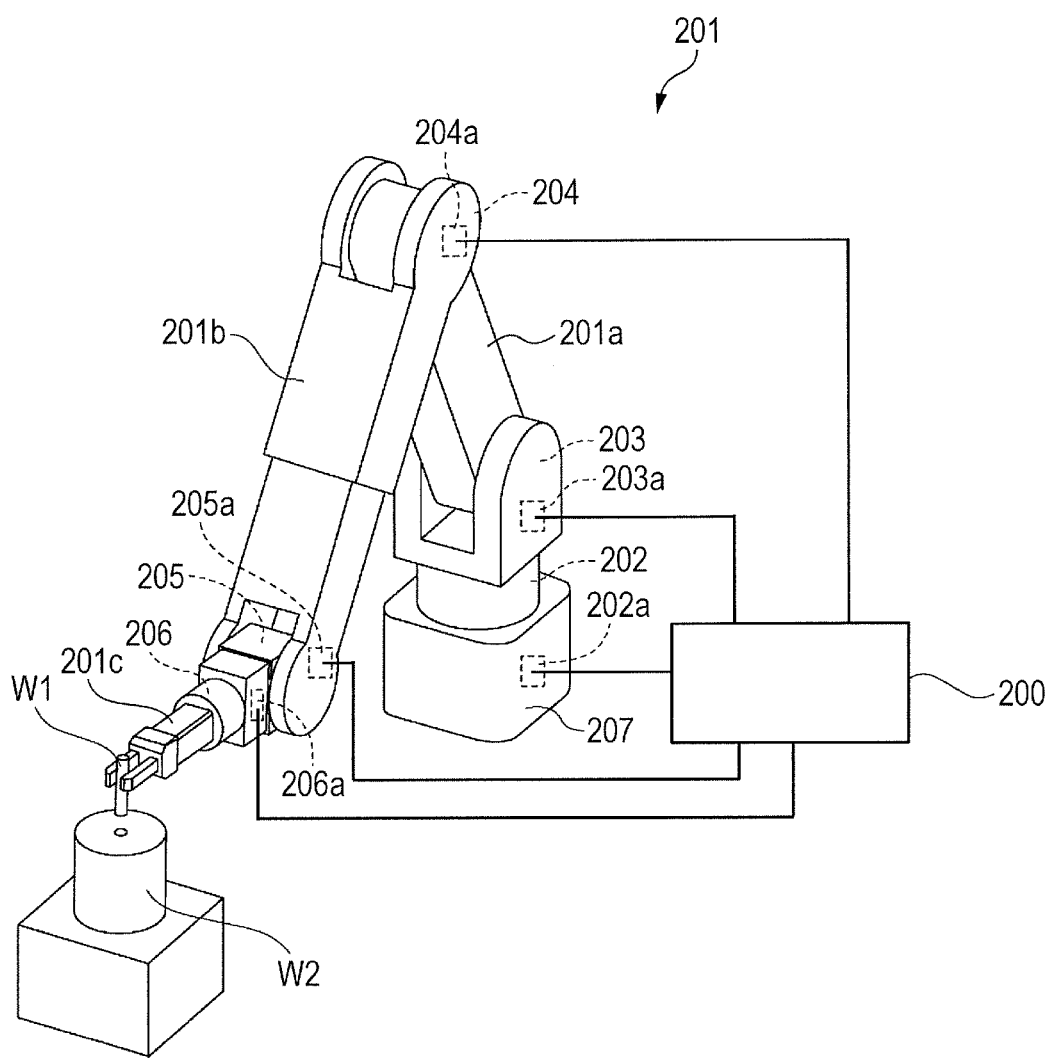
FIG. 1 is a perspective view illustrating an example of a robot as a target of the present invention.

A schematic configuration of an example of a robot as a target of the present invention will be described with reference to FIG. 1. A robot arm 201 includes: motors 202 to 206 as a plurality of actuators that operate arm sections 201a to 201c as mechanical sections of the robot; and a control apparatus 200 that controls the motors 202 to 206. Motor control units 202a to 206a as actuator control units respectively included in the motors 202 to 206 are connected to the control apparatus 200. Other than the arm sections 201a to 201c, examples of the mechanical sections that are operated by the motors 202 to 206 include constituent members of the robot subsequent to rotation axes of the motors, such as decelerators that decelerate and transmit the drive of the motors.

The motors 202 to 206 are arranged at drive sections of the robot, such as joint sections of the robot arm 201. The motor 202 rotates the entire robot arm 201 relative to a base 207. The motor 203 turns the arm section 201a in a vertical direction of FIG. 1 relative to the base 207. The motor 204 turns the arm section 201b relative to the arm section 201a. The motor 205 turns the arm section 201c relative to the arm section 201b. The motor 206 turns a tip section of the arm section 201c relative to a base section.

The robot arm 201 with the configuration performs, for example, operation of inserting a rod-shaped work piece W1 to a hole formed on a cylindrical work piece W2 as follows. When a user inputs such an instruction, the control apparatus 200 calculates a trajectory of fingers of the robot arm 201. The motor control units 202a to 206a control the motors 202 to 206 based on the trajectory to drive the 202 to 206 to thereby operate the robot arm 201 to insert the work piece W1 to the hole formed on the cylindrical work piece W2.

Embodiment

An embodiment of the present invention will be described with reference to FIGS. 2 to 7B. In the present specification, an ordered set of the position and posture of the robot is defined as a path. A time-series angle command value is defined as a target trajectory. A target trajectory obtained by compensating and modifying an amount of deflection will be defined as a deflection correction trajectory. Drive of an actuator according to the deflection correction trajectory is defined as deflection correction drive. A value including at least one of a target position, a target path, and a target posture provided as a command value by the user to the robot is defined as a target value.

[Robot]

Figure 2:
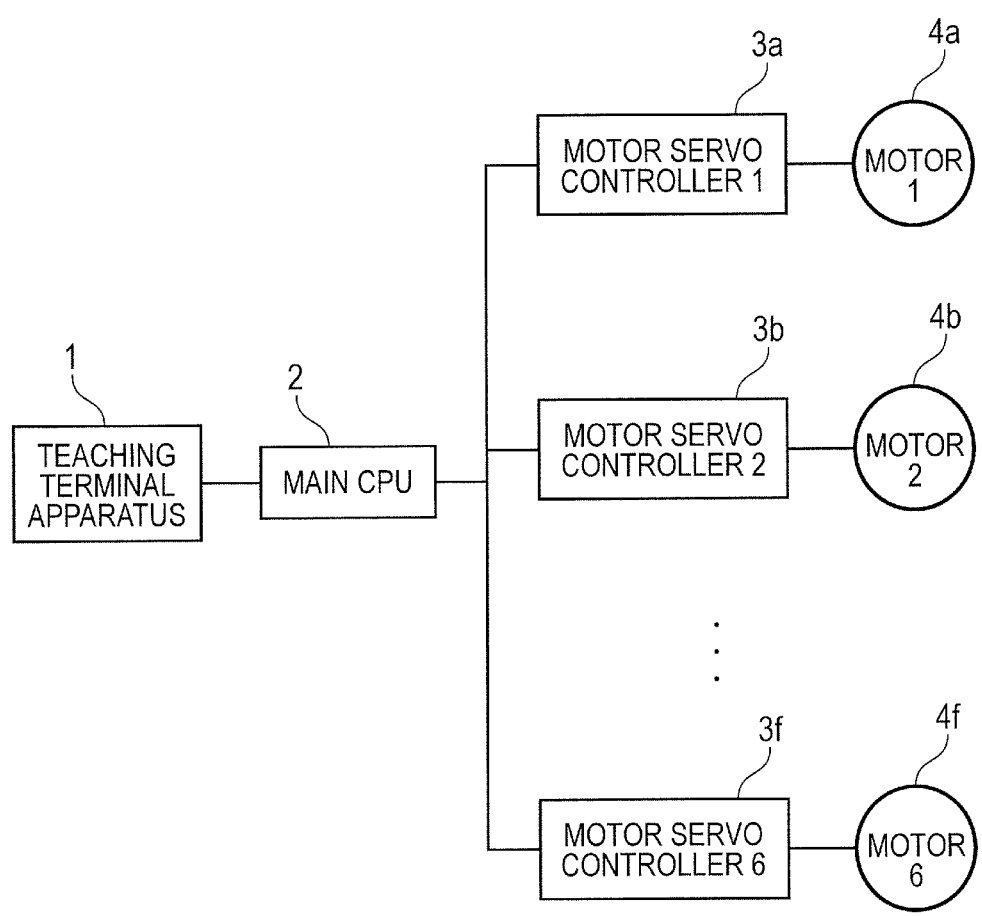
FIG. 2 is a block diagram of the robot according to an embodiment of the present invention.

The robot of the present embodiment will be described with an example of a six-axis articulated robot arm with a control configuration as illustrated in FIG. 2. A main CPU 2 as a control apparatus of the robot executes an interpolation process between teaching points based on teaching point information (target value) obtained from a teaching terminal apparatus 1, such as a teaching pendant, to decide the trajectory of the fingers of the robot arm (trajectory of robot) as described later.

Motor servo controllers 3a to 3f as actuator control units use the trajectory decided by the main CPU 2 to control motors 4a to 4f. Although not illustrated, angle/angular velocity detectors, such as encoders, are attached to the motors 4a to 4f of the axes, and detected angles and angular velocities of the motors are fed back to the motor servo controllers 3a to 3f. The robot is controlled as described in FIG. 1. The main CPU 2 is equivalent to the control apparatus 200 of FIG. 1. The motors 4a to 4f are equivalent to the motors 202 to 206 of FIG. 1. The motor servo controllers 3a to 3f are equivalent to the motor control units 202a to 206a.

When the robot arm is controlled in this way, the main CPU 2 can calculate and correct the deflections generated at the joint sections to drive the motors of the axes to thereby perform highly accurate operation of the finger position and posture of the robot arm. In the present embodiment, when the deflections generated at the joint sections of the robot are calculated and corrected to drive the motors of the axes, a constraint value of actuator performance (motor performance) is taken into account to modify the target trajectory. This prevents the actuator performance from exceeding the constraint, and when there is a surplus, the surplus is effectively utilized to realize reduction of the operation time. This point will be described in detail below.

[Control Apparatus of Robot]

Figure 3:
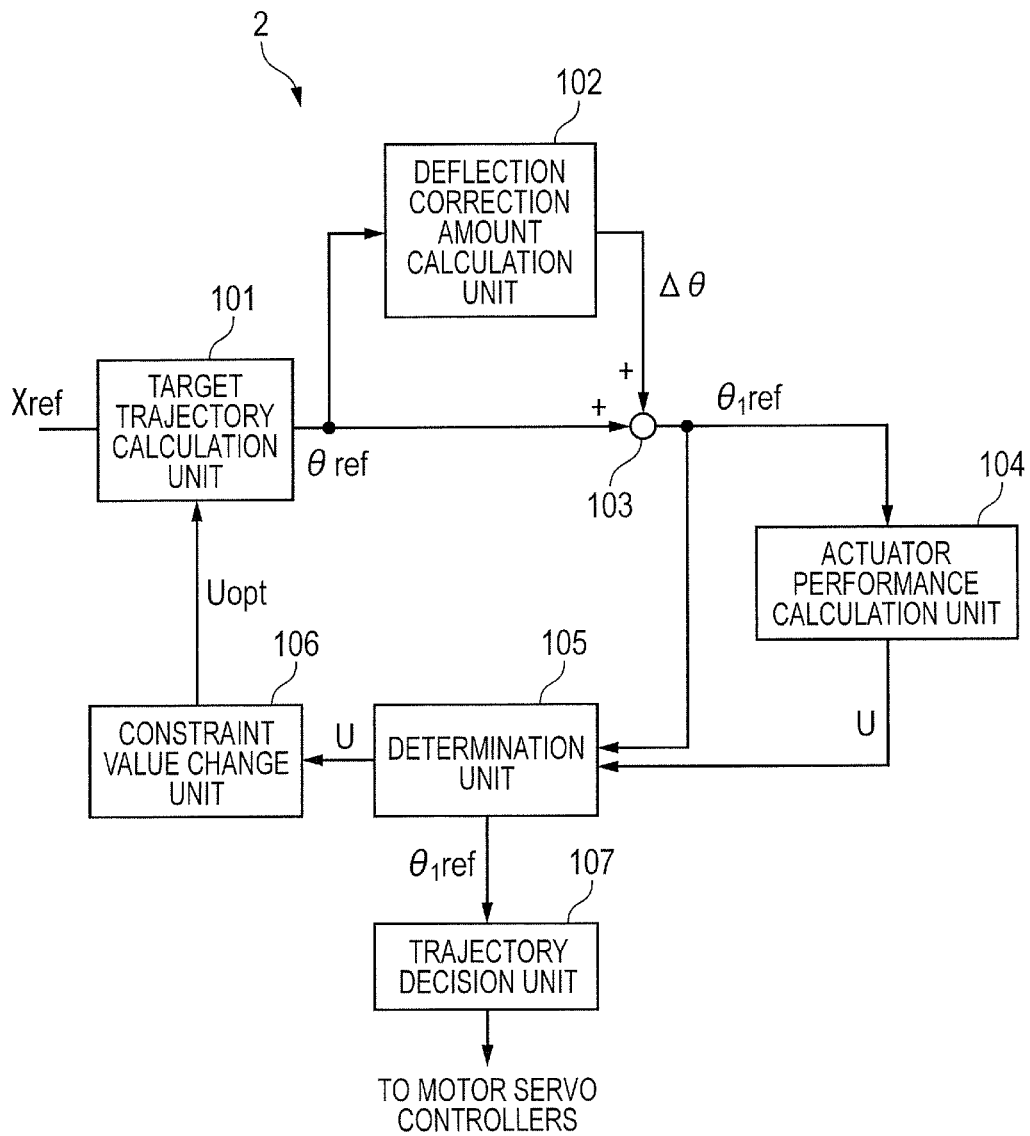
FIG. 3 is a block diagram illustrating a control apparatus of the robot based on a relationship between processing units according to the embodiment of the present invention.
Figure 4:
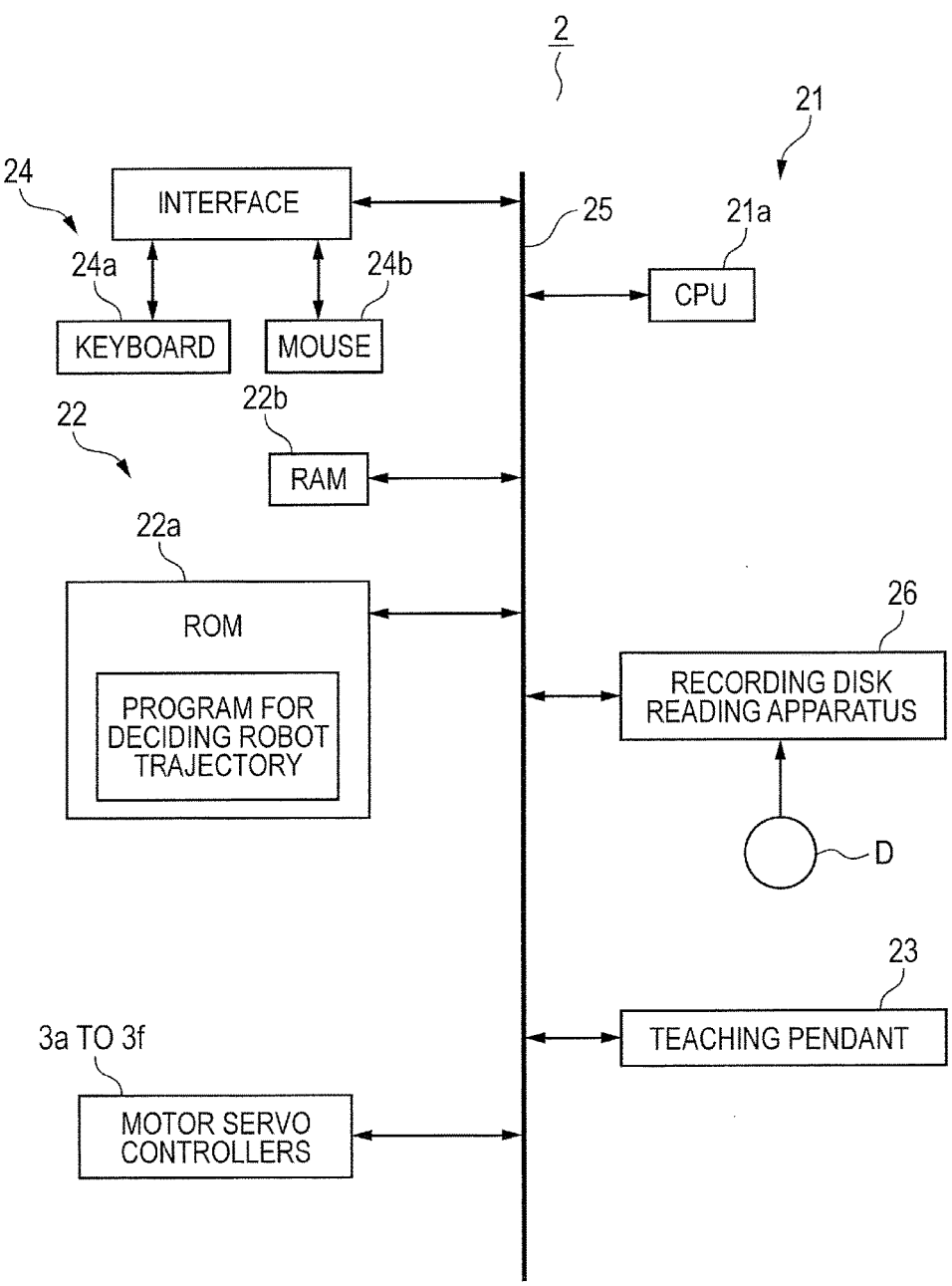
FIG. 4 is a block diagram illustrating the control apparatus of the robot based on a relationship between structures according to the embodiment of the present invention.
Figure 5:
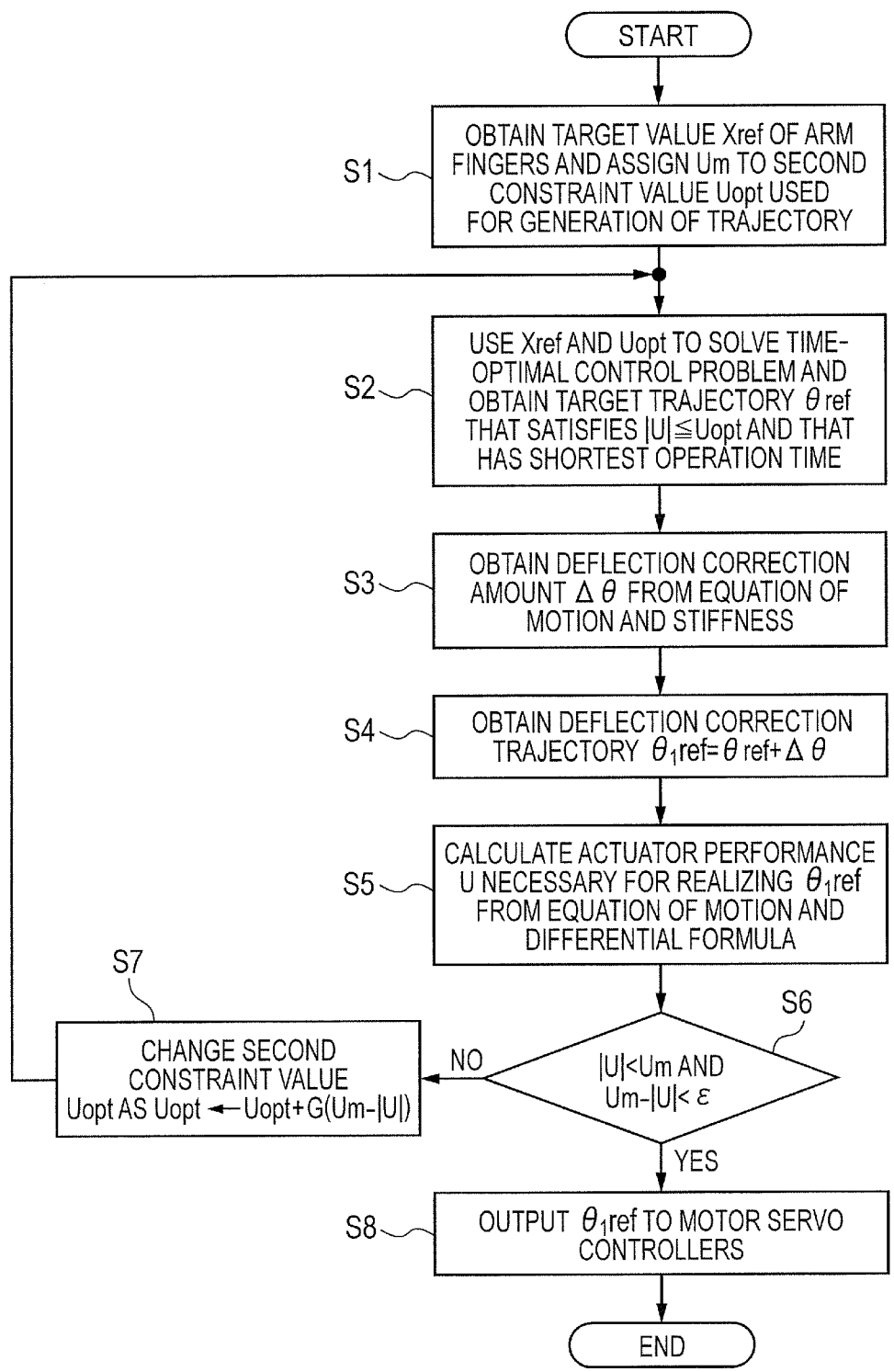
FIG. 5 is a flow chart for obtaining a deflection correction trajectory by the control apparatus of the robot according to the embodiment of the present invention.

The main CPU 2 as a control apparatus of the robot that performs the control will be described with reference to FIGS. 3 to 5. FIG. 3 is a block diagram illustrating the main CPU 2 by segments of processing units. The main CPU 2 includes a target trajectory calculation unit 101, a deflection correction amount calculation unit 102, a deflection correction trajectory calculation unit 103, an actuator performance calculation unit 104, a determination unit 105, a constraint value change unit 106, and a trajectory decision unit 107.

The target path of the arm fingers of the robot (target value of robot) is defined as Xref, and the target trajectory of each axis is defined as θref. A vector indicating the actuator performance (motor performance) including motor angular velocity, angular acceleration, angular jerk, and torque of each axis is defined as U. A first constraint value as an upper limit of the actuator performance preset by taking into account a limit value or surplus of the performance of the motors 4a to 4f is defined as Um. A second constraint value of the actuator performance used in the calculation of the target trajectory is defined as Uopt. The elements of Um are positive values. The second constraint value Uopt can be changed as described later. In the following description, although each of the actuator performance U, the first constraint value Um, and the second constraint value Uopt is torque for the simplification, the angular velocity, the angular acceleration, and the angular jerk may have values.

The target trajectory calculation unit 101 uses the target value Xref of the robot and the second constraint value Uopt to solve a time-optimal control problem as an optimal control problem to thereby calculate the target trajectory θref of each axis (robot) that satisfies the constraint condition and that has the shortest operation time.

The optimal control problem is for optimal control of evaluation functions, and for example, time and swing are optimally controlled. In the time-optimal control problem, the evaluation functions of the optimal control problem are indicated by time. Although the optimal control problem is the time-optimal control problem in the following description, the same applies even if other evaluation functions are included. An example of the method of solving the time-optimal control problem includes a method described in a document by J. E. Bobrow et al. The document is "J. E. Bobrow et. al, "Time-Optimal Control of Robotic Manipulators Along Specified Paths", Int. J. of Robotics Research, 4, 3, pp. 3-17, 1989".

The deflection correction amount calculation unit 102 calculates the deflection correction amount of the robot for operating the robot based on the target trajectory calculated by the target trajectory calculation unit 101. More specifically, the deflection correction amount calculation unit 102 handles the target trajectory θref as input and outputs a deflection correction amount Δθ from an equation of motion of the entire robot arm and stiffness. In the present embodiment, only the deflection in the motor rotation direction of each joint section will be taken into account for the simplification.

The equation of motion of the robot arm can be expressed as follows.

$$M \times ddq + h + g = \tau$$

M denotes an inertia matrix, ddq denotes acceleration, h denotes centrifugal force and Coriolis force, g denotes gravity, and τ denotes load torque on each joint section. The reference characters ddq, h, g, and τ re vectors. The inertia matrix M is determined by the configuration of the robot arm, and the acceleration ddq is obtained from a second order differential of the trajectory using time. Therefore, the load toque τ on each joint section can be obtained from the equation of motion of the robot arm.

Once the load torque τ is obtained, τ can be divided by a stiffness value K as in the following formula to obtain the amount of deflection Δθ of each joint section.

$$\Delta\theta = \tau / K$$

The stiffness value K is a stiffness value in the rotation direction of each axis, that is, torsional stiffness (strength in the torsional direction, the unit is "Nm/rad"), and is set in advance. Since only the deflection in the motor rotation direction of each joint section is taken into account, the amount of deflection of the joint and the deflection correction amount are equal values. The deflection correction amount may include not only the deflection in the torsional direction, but also the deflection in the translational direction.

The deflection correction trajectory calculation unit 103 corrects the target trajectory from the deflection correction amount calculated by the deflection correction amount calculation unit 102 to calculate the deflection correction trajectory. More specifically, the deflection correction trajectory calculation unit 103 handles the target trajectory θref and the deflection correction amount Δθ as input to output a deflection correction trajectory $\theta_1$ref by adding the target trajectory θref and the deflection correction amount Δθ.

The actuator performance calculation unit 104 calculates the performance of the actuators (motors) necessary for operating the robot based on the deflection correction trajectory calculated by the deflection correction trajectory calculation unit 103. Thus, the actuator performance calculation unit 104 handles the deflection correction trajectory $\theta_1$ref as input to output the actuator performance U from the equation of motion of the entire robot arm. Specifically, the acceleration ddq of the equation of motion is obtained from a second order differential of the deflection correction trajectory $\theta_1$ref, and τ is calculated as the actuator performance U.

The determination unit 105 determines whether a first condition that the actuator performance calculated by the actuator performance calculation unit 104 is within a range of the first constraint value and a second condition that the difference between the first constraint value and the actuator performance is within a range of a predetermined value are satisfied. In other words, the actuator performance U is handled as input, and whether the actuator performance U does not exceed the first constraint value Um and whether the actuator performance U is near the first constraint value Um are determined.

Therefore, the first condition is $|U|<Um$, and the second condition is $Um-|U|<\epsilon$. The value ε is the predetermined value described above and is a minute amount that can be arbitrarily set within a range less than Um. The value of ε determines how much the ultimate result can be close to the first constraint value. Therefore, ε is set based on the calculation time and the surplus of the actuator performance (torque in the present embodiment).

The constraint value change unit 106 changes the second constraint value when the determination unit 105 determines that one of the first condition and the second condition is not satisfied. Thus, the second constraint value Uopt used in the time-optimal control problem is changed and output. Specifically, when the determination unit 105 determines that one of the first condition and the second condition is not satisfied, the actuator performance U used in the determination is output, and the actuator performance U is input to the constraint value change unit 106. The constraint value change unit 106 subtracts the actuator performance U from the first constraint value Um, multiplies the value by a predetermined gain G greater than 0, and adds the calculated value to the second constraint value Uopt to set the second constraint value Uopt after change.

A predetermined gain G is a preset value greater than 0. The calculation time becomes long if the gain G is a small value, and the ultimate result is unlikely to be close to the first constraint value if the gain G is a large value. Therefore, ϵ and the calculation time are taken into account to arbitrarily set the gain G.

The second constraint value Uopt after change is input to the target trajectory calculation unit 101, and the target trajectory calculation unit 101 performs the calculation as described above to newly calculate a target trajectory. Subsequently, the new target trajectory is used to calculate the deflection correction trajectory as described above, and the actuator performance based on the deflection correction trajectory is calculated to perform the determination by the determination unit 105.

Therefore, in the main CPU 2, the constraint value change unit 106 changes the second constraint value Uopt until the first condition and the second condition are satisfied, and convergent calculation for repeating the calculation of the actuator performance relative to the deflection correction trajectory is performed. In other words, the target trajectory and the deflection correction trajectory are modified until the first condition and the second condition are satisfied.

The trajectory decision unit 107 decides, as the trajectory of the robot, the deflection correction trajectory calculated by the deflection correction trajectory calculation unit 103 when the determination unit 105 determines that the first condition and the second condition are satisfied. Specifically, when the determination unit 105 determines that |U|<Um as the first condition and Um−|U|<ϵ as the second condition are satisfied, the deflection correction trajectory $\theta_1$ref at this point is output, and the deflection correction trajectory $\theta_1$ref is input to the trajectory decision unit 107. The trajectory decision unit 107 decides the input deflection correction trajectory $\theta_1$ref as the trajectory of the robot and outputs the trajectory to the motor servo controllers 3a to 3f.

In the present embodiment, the main CPU 2 is operated based on a program of the robot installed in advance. As illustrated in FIG. 4, the main CPU 2 includes the motor servo controllers 3a to 3f connected to the computer main body including an arithmetic apparatus 21 and a storage apparatus 22. An input apparatus 24, such as a teaching pendant 23, a keyboard 24a, and a mouse 24b, for the operator to perform input operation is also connected to the computer main body. The teaching pendant 23 is equivalent to the teaching terminal apparatus 1 of FIG. 1.

The storage apparatus 22 stores various data, such as shape data of work pieces. In addition, a control driver of the motors and various programs, such as an assembly procedure computation program for causing the computer (arithmetic apparatus 21) to perform computation of an assembly procedure of work pieces, are stored. In the present embodiment, a program for deciding the trajectory of the robot is further stored.

More particularly, the computer main body mainly includes a CPU 21a, and a ROM 22a and a RAM 22b are connected to the CPU 21a through a bus 25. The ROM 22a stores a program necessary for basic control of the robot and stores various programs and data, such as the program for deciding the trajectory of the robot. The RAM 22b secures a working area for the CPU 21a.

The motor servo controllers 3a to 3f are connected to the bus 25, and a recording disk reading apparatus 26 is also connected. The CPU 21a can read a recording medium D recording a program for deciding the trajectory of the robot and can store the program in, for example, the ROM 22a. In addition to the ROM 22a and the RAM 22b as main storage apparatuses, the storage apparatus 22 includes the computer-readable recording medium D and other external storage apparatuses.

The target trajectory calculation unit 101, the deflection correction amount calculation unit 102, the deflection correction trajectory calculation unit 103, the actuator performance calculation unit 104, the determination unit 105, the constraint value change unit 106, and the trajectory decision unit 107 are formed by the arithmetic apparatus 21 and the storage apparatus 22.

A control flow based on the program for deciding the trajectory of the robot of the present embodiment will be described with reference to FIG. 5. The main CPU 2 executes a process according to a flow chart illustrated in FIG. 5 to realize the function of the control apparatus of the robot illustrated in FIG. 3. Correspondence between the control apparatus (main CPU 2) of FIG. 3 and the flow chart of FIG. 5 is as follows. S2 corresponds to the target trajectory calculation unit 101, S3 corresponds to the deflection correction amount calculation unit 102, S4 corresponds to the deflection correction trajectory calculation unit 103, S5 corresponds to the actuator performance calculation unit 104, S6 corresponds to the determination unit 105, S7 corresponds to the constraint value change unit 106, and S8 corresponds to the trajectory decision unit 107. The flow chart of FIG. 5 will be used in the following description.

An interpolation process between the teaching points is executed based on the teaching point information obtained from the teaching terminal apparatus 1, and the target value (target path (teaching point, interpolation point)) Xref of the arm fingers is calculated. Along with this, the first constraint value Um of the actuator performance is set as the second constraint value Uopt used to generate the trajectory (S1).

The target path Xref of the arm fingers and the second constraint value Uopt are used to solve the time-optimal control problem to obtain the target trajectory θref of each axis that satisfies |U|Uopt and that has the shortest operation time (S2).

The deflection correction amount Δθ of each joint is obtained by obtaining the load torque τ on each joint section from the equation of motion of the robot arm and dividing the load torque τ by the stiffness value K (S3). The deflection correction amount Δθ is added to the target trajectory θref to obtain the deflection correction trajectory $\theta_1$ref (S4). The obtained deflection correction trajectory $\theta_1$ref is used to calculate the actuator performance U from the equation of motion of the robot arm (S5).

Whether the absolute value of the actuator performance U is within the range of the second constraint value Um (first condition) is determined, and whether the difference between the second constraint value Um and the absolute value of the actuator performance U is within the range of the minute amount ϵ (second condition) is determined (S6). The conditions denote that the actuator performance is a value equal to or greater than the first constraint or that the actuator performance is not near the first constraint value.

If one of the first condition and the second condition of S6 is not satisfied, |U| is subtracted from Um to multiply the value by the gain G (G>0) set in advance, and the value is added to the second constraint value Uopt used for generating the trajectory to set the value as a new second constraint value Uopt (S7). The process returns to S2. Once the process returns to S2, the new second constraint value Uopt is used to solve the time-optimal control problem again, and the target trajectory θref is modified. The process of S2 to S7 is repeatedly executed until the conditions of S6 are satisfied.

If the conditions of S6 are satisfied, the currently obtained deflection correction trajectory $\theta_1\text{ref}$ is decided as the trajectory of the robot and is output to the motor servo controllers (S8).

The change in the second constraint value has an advantageous effect of increasing the operation time in S2 by reducing the second constraint value Uopt used for the convergent calculation if the actuator performance U exceeds the first constraint value Um. Since the necessary actuator performance U is reduced with the increase in the operation time, the necessary actuator performance U can be close to the first constraint value Um. On the other hand, if the actuator performance U is smaller than the first constraint value Um by ϵ or more, that is, if there is a surplus, an increase in the second constraint value Uopt has an advantageous effect of reducing the operation time in S2. Since the necessary actuator performance U increases with the reduction in the operation time, the necessary actuator performance U can be close to the first constraint value Um.

As described, the second constraint value for solving the time-optimal control problem can be changed to obtain the deflection correction trajectory that allows the actuator performance necessary for the deflection correction drive to be within the range of the predetermined value relative to the first constraint value, without exceeding the first constraint value. Therefore, the actuator performance can be effectively utilized, and the deflection correction drive can be performed without the actuator performance necessary for the deflection correction drive exceeding the upper limit of the performance of the actuator.

Thus, since the necessary actuator performance U does not exceed the first constraint value Um, the occurrence of the response deterioration associated with the increase in the tracking errors of the actuators and the occurrence of the error termination due to over current can be suppressed. When there is a surplus in the necessary actuator performance U relative to the first constraint value Um, the deflection correction trajectory $\theta_1\text{ref}$ effectively utilizing the generated surplus is obtained. Therefore, the operation time of the robot can be reduced.

More specifically, the actuator performance necessary at the deflection correction drive can be taken into account to modify the target trajectory to generate the deflection correction trajectory that can be realized by the mounted actuators and that has the shortest operation time. For example, when the necessary torque is greater than before the correction as a result of the deflection correction and is greater than the allowable output torque as a limiting value, although the operation time increases a little by the modification of the target trajectory, the necessary torque at the deflection correction drive can be within the limiting value. Therefore, the occurrence of the response deterioration associated with the increase in the tracking errors of the actuators and the occurrence of the error termination due to over current can be suppressed, and the robot can continue the highly accurate operation. On the other hand, when the necessary torque is reduced by the deflection correction, the generated surplus torque can be effectively utilized to reduce the operation time within the range that the necessary torque at the deflection correction drive is within the limiting value.

Example

Figure 6A:
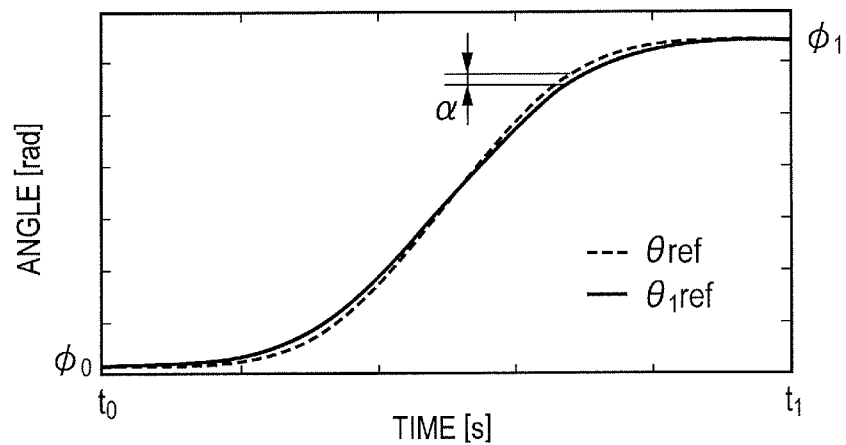
FIG. 6A is a diagram illustrating a relationship between a target trajectory and a deflection correction trajectory in a comparison example without execution of a process of the present invention.
Figure 6B:
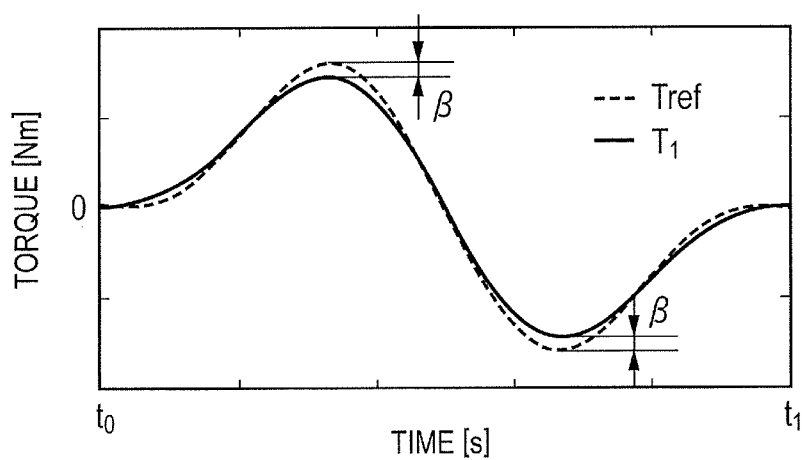
FIG. 6B is a diagram illustrating a relationship between motor torque for realizing the target trajectory and motor torque for realizing the deflection correction trajectory in the comparison example without the execution of the process of the present invention.

Advantageous effects of the present embodiment will be described in comparison with a case that the present embodiment is not satisfied. FIGS. 6A and 6B will be used in the description to further clarify the relationship between the target trajectory without the deflection being taken into account and the deflection correction trajectory.

FIG. 6A is an explanatory view for comparing the target trajectory $\theta\text{ref}$ without the deflection correction being taken into account and the deflection correction trajectory $\theta_1\text{ref}$ in the drive of the six-axis articulated robot arm. The target trajectory $\theta\text{ref}$ is a trajectory of movement from an angle $\phi_0$ to an angle $\phi_1$ from time $t_0$ to time $t_1$. FIG. 6A illustrates the time on the x axis and the angle on the y axis. A broken line denotes the target trajectory $\theta\text{ref}$, and a solid line denotes the deflection correction trajectory $\theta_1\text{ref}$.

FIG. 6B is an explanatory view for comparing motor torque Tref necessary for realizing $\theta\text{ref}$ and motor torque $T_1$ necessary for realizing $\theta_1\text{ref}$. FIG. 6B illustrates the time on the x axis and the torque on the y axis. A broken line denotes the motor torque Tref necessary for realizing the target trajectory, and a solid line denotes the motor torque $T_1$ necessary for realizing the deflection correction trajectory.

As illustrated in FIG. 6A, the deflection correction trajectory $\theta_1\text{ref}$ is changed by $\alpha[\text{rad}]$ at the maximum relative to the target trajectory $\theta\text{ref}$. This is because the deflection correction amount is added to the deflection correction trajectory. Since the trajectory changes in this way, the necessary torque also changes accordingly.

As illustrated in FIG. 6B, the maximum value of the motor torque $T_1$ is smaller than the maximum value of the motor torque Tref, and $T_1$ is smaller by $\beta[\text{Nm}]$. This is a state in which the necessary actuator performance is excessive relative to the constraint value due to the reduction in the necessary torque as a result of the correction of the amount of deflection, and the performance of the actuator is not effectively utilized. In the present embodiment, the generated surplus is used to reduce the operation time.

The case of modifying the trajectory by repeated calculation of S2 to S7 of the flow illustrated in FIG. 5 using the surplus (embodiment) and a case of not modifying the trajectory (comparison example) will be described with reference to FIGS. 7A and 7B.

Figure 7A:
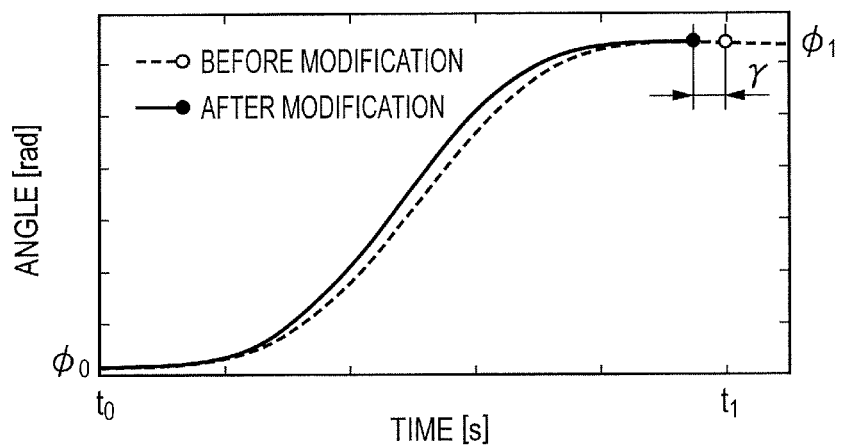
FIG. 7A is a diagram illustrating deflection correction trajectories, in which cases with and without the execution of the process of the present invention are compared.
Figure 7B:
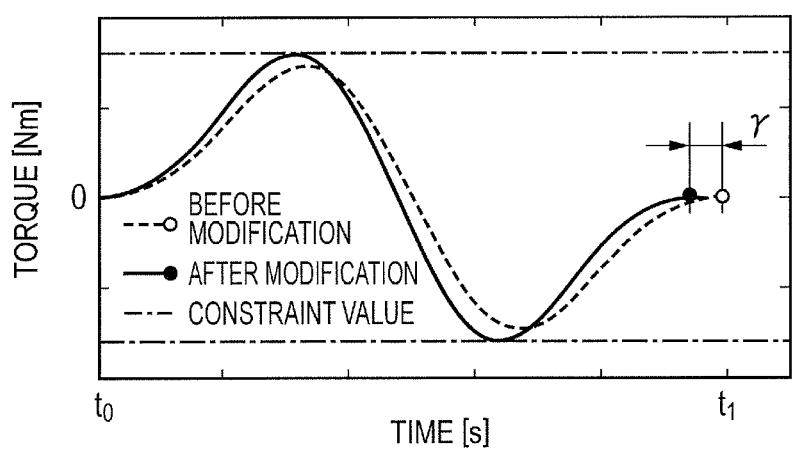
FIG. 7B is a diagram illustrating motor torque for realizing the deflection correction trajectory, in which the cases with and without the execution of the process of the present invention are compared.

FIGS. 7A and 7B are diagrams of the deflection correction trajectory $\theta_1\text{ref}$ and the motor torque $T_1$, respectively. FIG. 7A illustrates the time on the x axis and the angle on the y axis. FIG. 7B illustrates the time on the x axis and the torque on the y axis. Broken lines of FIGS. 7A and 7B denote values obtained first in S5, that is, values before the modification of the trajectory. Solid lines denote values in S8, that is, values after the modification of the trajectory by the repeated calculation. An alternate long and short dash line in FIG. 7B denotes the first constraint value of the motor torque.

As illustrated in FIG. 7B, there is a surplus of the motor torque before modification relative to the first constraint value, and the performance of the actuator is not effectively utilized. On the other hand, the motor torque after modification is a value near the first constraint value. Accordingly, the operation time of the deflection correction trajectory after the modification is smaller than before the modification by $\gamma[\text{s}]$ as illustrated in FIG. 7A. In this way, it can be recognized that the motor torque is effectively utilized up to the proximity of the first constraint value as a result of the modification of the trajectory by the repeated calculation and that the operation time can be reduced.

The present invention is also realized by execution of the following process. That is a process in which software (program) for realizing the functions of the embodiment is supplied to a system or an apparatus through a network or various storage media, and a computer (or CPU or MPU) of the system or the apparatus reads and executes the program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-031872, filed Feb. 16, 2012, which is hereby incorporated by reference herein in its entirety.

The invention claimed is:

1. A trajectory generation apparatus for calculating a trajectory along which a robot is driven in which each of a plurality of joint sections is driven by an actuator with a first constraint value that is set as an upper limit of performance, the trajectory generation apparatus comprising:
at least one processor and a memory functioning as:
a target trajectory calculation unit constructed to use a target value of the robot and the first constraint value to solve an optimal control problem to calculate a target trajectory from a first point to a second point of the robot;
a deflection correction amount calculation unit constructed to calculate a deflection correction amount of each of the plurality of joint sections of the robot when the robot is operated based on the target trajectory;
a deflection correction trajectory calculation unit constructed to correct the target trajectory from the first point to the second point from the respective deflection correction amounts to calculate a deflection correction trajectory from the first point to the second point;
an actuator performance calculation unit constructed to calculate performance of the actuator necessary to operate the robot based on the deflection correction trajectory;
a determination unit constructed to determine whether a first condition that the actuator performance calculated by the actuator performance calculation unit is within a range of the first constraint value and a second condition that a difference between the first constraint value and the actuator performance is within a range of a predetermined value are satisfied;
a recalculating unit constructed to recalculate the target trajectory of the robot by replacing the first constraint value in the target trajectory calculation unit with a second constraint value and using the target value of the robot and the second constraint value to solve the optimal control problem if the determination unit determines that one of the first condition and the second condition is not satisfied; and
a trajectory decision unit constructed to output to the actuator, as a trajectory of the robot, the deflection correction trajectory calculated by the deflection correction trajectory calculation unit if the determination unit determines that the first condition and the second condition are satisfied, wherein the actuator is constructed to drive the plurality of joint sections of the robot in accordance with the trajectory output by the trajectory decision unit.

2. The trajectory generation apparatus according to claim 1, wherein the recalculating unit subtracts the actuator performance from the first constraint value, multiplies the value by a predetermined gain greater than 0, and adds the calculated value to the first constraint value to calculate the second constraint value.

3. The trajectory generation apparatus according to claim 1, wherein the deflection correction amount calculation unit calculates the respective deflection correction amounts from the target trajectory, an equation of motion of the robot, and stiffness of the robot.

4. A robot comprising:
an actuator;
a mechanical section operated by the actuator;
a trajectory generation apparatus according to claim 1; and
an actuator control unit that controls the actuator,
wherein the actuator control unit controls the actuator based on the trajectory decided by the trajectory generation apparatus.

5. A trajectory generation method for calculating a trajectory along which a robot is driven in which each of a plurality of joint sections of the robot is driven by an actuator with a first constraint value that is set as an upper limit of performance, the trajectory generation method comprising the steps of:
calculating, by a target trajectory calculation unit, a target trajectory from a first point to a second point of the robot by using a target value of the robot and the first constraint value and solving an optimal control problem;
calculating, by a deflection correction amount calculation unit, a deflection correction amount of each of the plurality of joint sections of the robot when the robot is operated based on the target trajectory;
calculating, by a deflection correction trajectory calculation unit, a deflection correction trajectory from the first point to the second point by correcting the target trajectory from the first point to the second point from the respective deflection correction amounts;
calculating, by an actuator performance calculation unit, performance of the actuator necessary to operate the robot based on the deflection correction trajectory;
determining, by a determining unit, whether a first condition that the actuator performance calculated in the calculating the actuator performance step is within a range of the first constraint value and a second condition that a difference between the first constraint value and the actuator performance is within a range of a predetermined value are satisfied;
recalculating, by a recalculating unit, the target trajectory of the robot by replacing the first constraint value in the target trajectory calculation unit with a second constraint value and using the target value of the robot and the second constraint value to solve the optimal control problem if it is determined in the determining step that one of the first condition and the second condition is not satisfied;
outputting to the actuator, by a trajectory decision unit, as a trajectory of the robot, the deflection correction trajectory calculated in the calculating the deflection correction trajectory step if it is determined in the determining step that the first condition and the second condition are satisfied; and
driving, by the actuator, the plurality of joint sections of the robot in accordance with the trajectory of the robot decided by the trajectory decision unit.

6. The trajectory generation method according to claim 5, wherein in the recalculating, the actuator performance is subtracted from the first constraint value, the value is multiplied by a predetermined gain greater than 0, and the calculated value is added to the first constraint value to calculate the second constraint value.

7. The trajectory generation method according to claim 5, wherein in the calculating the deflection correction amount, the respective deflection correction amounts are calculated from the target trajectory, an equation of motion of the robot, and stiffness of the robot.

* * * * *